(12) United States Patent
Imade

(10) Patent No.: US 7,035,007 B2
(45) Date of Patent: Apr. 25, 2006

(54) REFLECTION SCREEN APPARATUS AND PROJECTION SYSTEM USING THE SAME

(75) Inventor: Shinichi Imade, Iruma (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/808,154

(22) Filed: Mar. 24, 2004

(65) Prior Publication Data

US 2004/0212879 A1 Oct. 28, 2004

(30) Foreign Application Priority Data

Mar. 28, 2003 (JP) .............................. 2003-092072

(51) Int. Cl.
G03B 21/56 (2006.01)

(52) U.S. Cl. .................................... 359/449

(58) Field of Classification Search ................ 359/443, 359/449, 446, 451, 452, 459
See application file for complete search history.

(56) References Cited

U.S. PATENT DOCUMENTS

| | | | | |
|---|---|---|---|---|
| 3,420,598 A * | 1/1969 | Goss | .......................... | 359/446 |
| 3,998,522 A * | 12/1976 | Holzel | .......................... | 359/451 |
| 4,750,808 A * | 6/1988 | Nash et al. | ................... | 359/451 |
| 5,491,584 A | 2/1996 | Schlienger | .................. | 359/443 |
| 5,696,625 A | 12/1997 | Malifaud et al. | ............ | 359/459 |
| 5,708,527 A * | 1/1998 | Adamson et al. | ............ | 359/451 |
| 6,646,800 B1 * | 11/2003 | Choi | ............................ | 359/451 |
| 6,839,168 B1 * | 1/2005 | Kobayashi | ................... | 359/446 |

FOREIGN PATENT DOCUMENTS

| | | |
|---|---|---|
| JP | 545733 | 2/1993 |
| JP | 5297466 | 11/1993 |
| JP | 6242511 | 9/1994 |
| JP | 06308613 | 11/1994 |
| JP | 07104384 | 4/1995 |
| JP | 07301864 | 11/1995 |
| JP | 8114430 | 5/1996 |
| JP | 1026802 | 1/1998 |
| JP | 2000162710 | 11/1998 |
| JP | 2000275755 | 10/2000 |

* cited by examiner

*Primary Examiner*—Christopher Mahoney
(74) *Attorney, Agent, or Firm*—Volpe and Koening, P.C.

(57) ABSTRACT

A reflection screen apparatus in which a projection apparatus projects an image based on received image data and an observer observes the image comprises a screen reflection surface which visibly diffuses and reflects the image projected by the projection apparatus to the observer. The reflection screen apparatus further has a light distribution correction section configured to change a state of a distribution direction of a light reflected on the screen reflection surface so as to increase a diffused light reflected on the screen reflection surface to the observer.

20 Claims, 13 Drawing Sheets

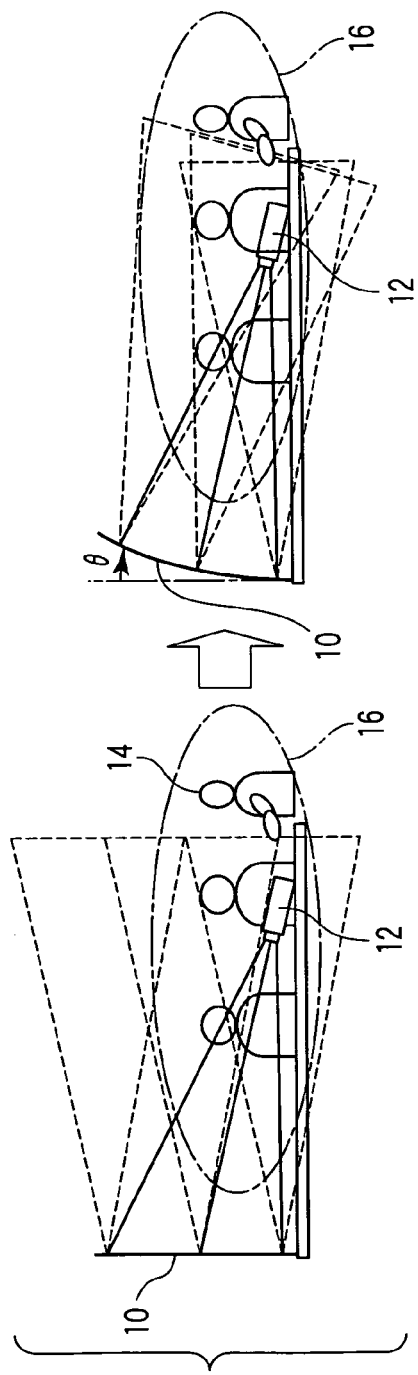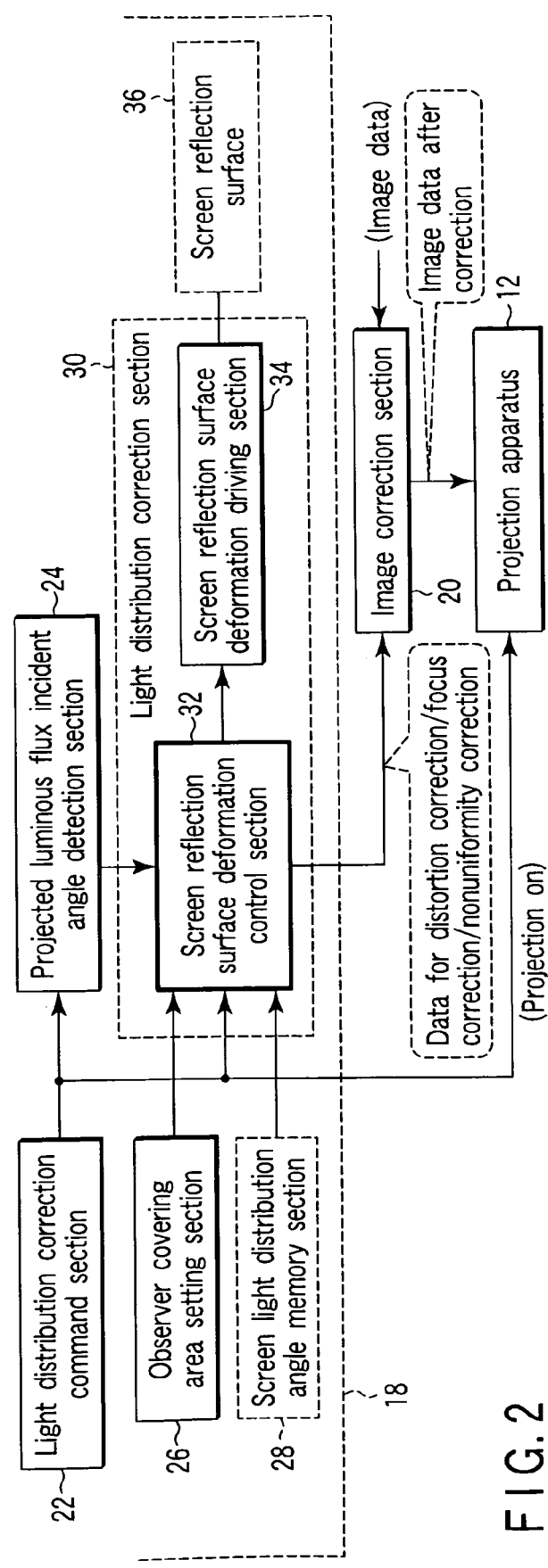

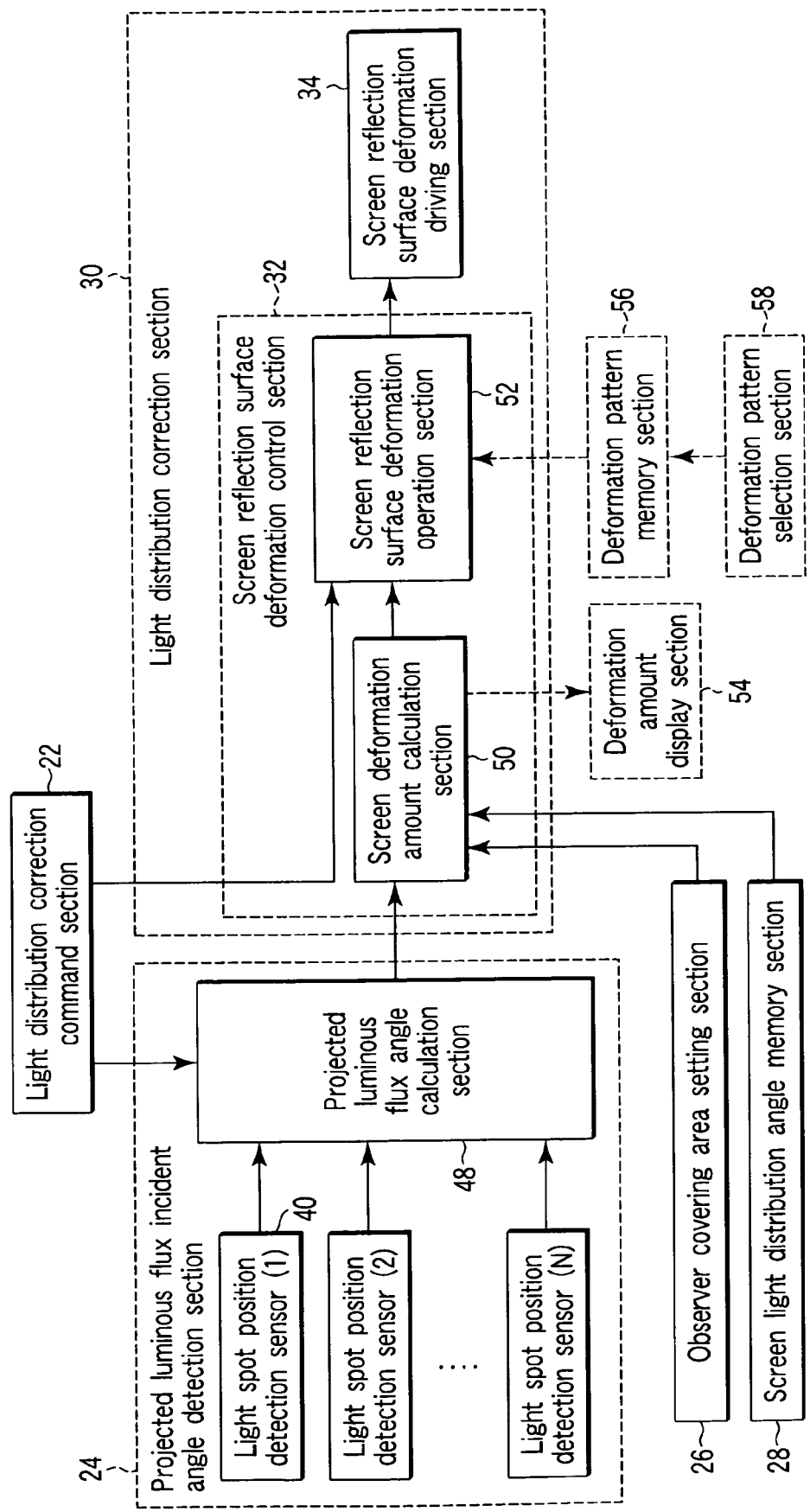
F I G. 4

Detected amount of light $\phi = \alpha - \beta + \gamma A$

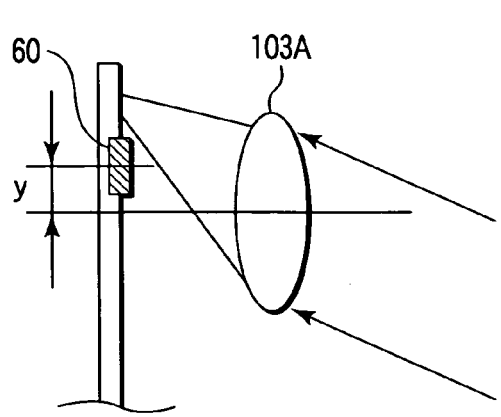
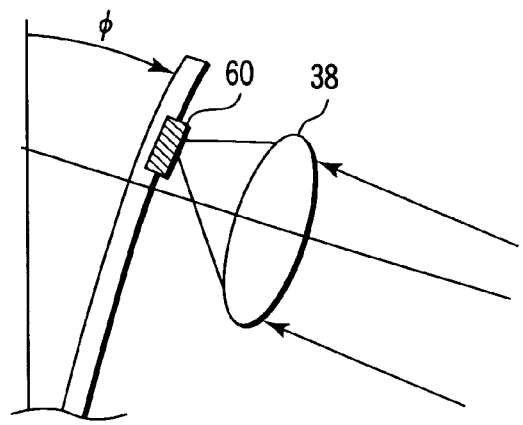
F I G. 15A    F I G. 15B
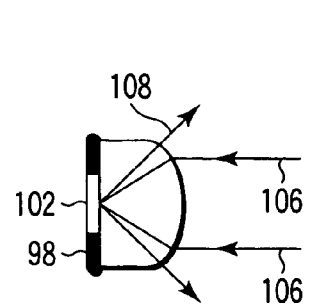
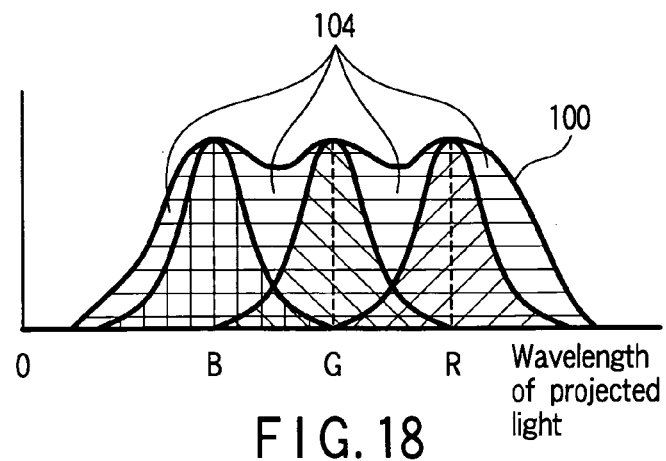
F I G. 17    F I G. 18
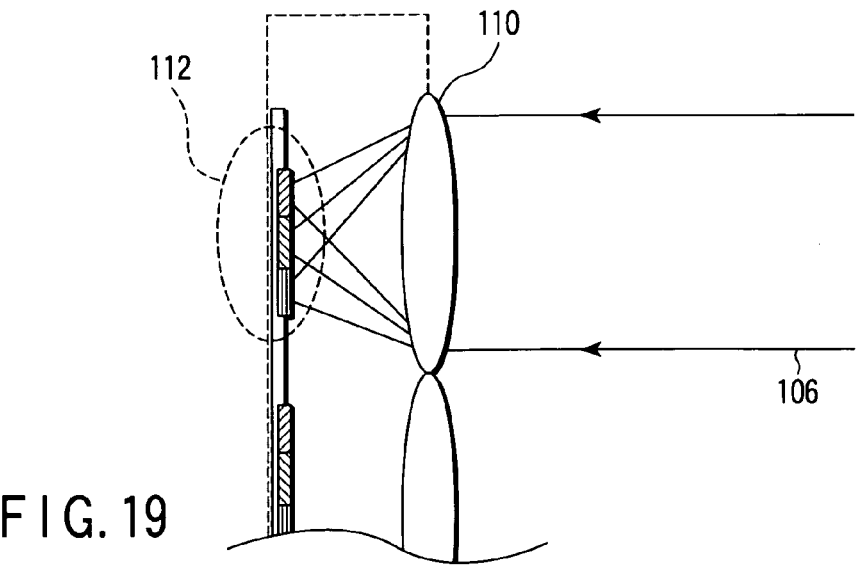
F I G. 19

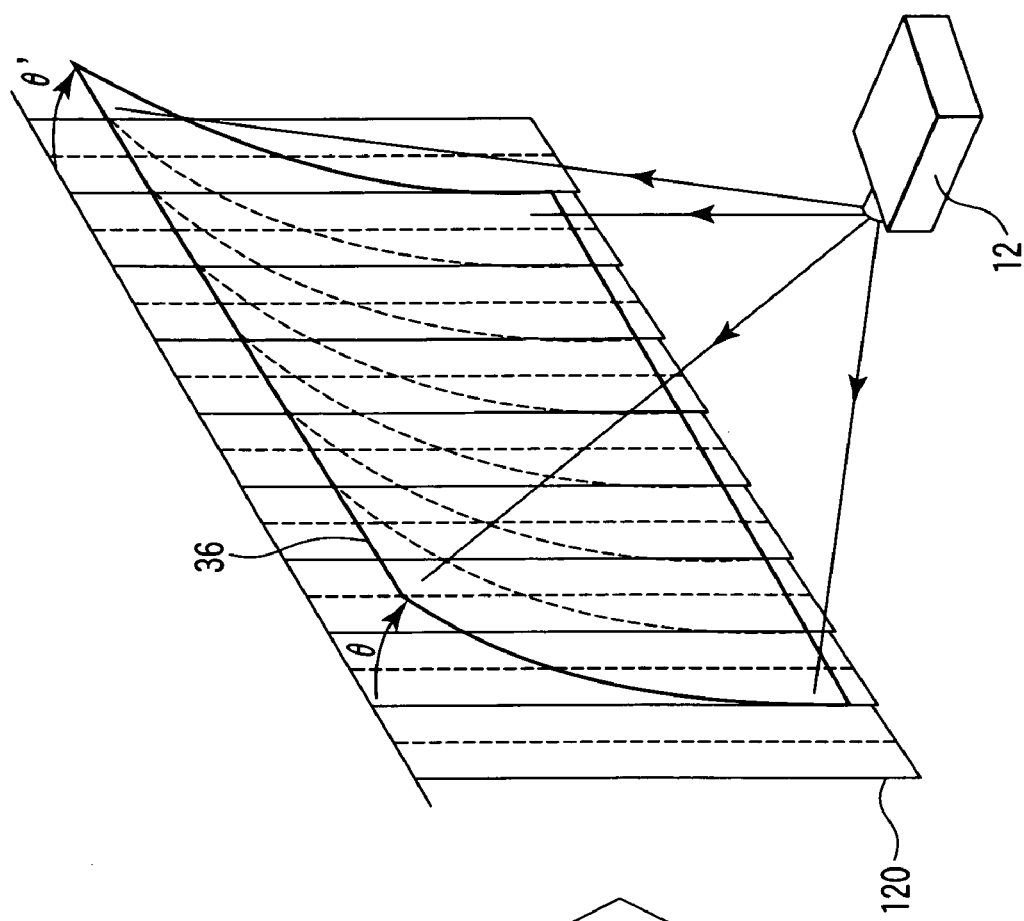
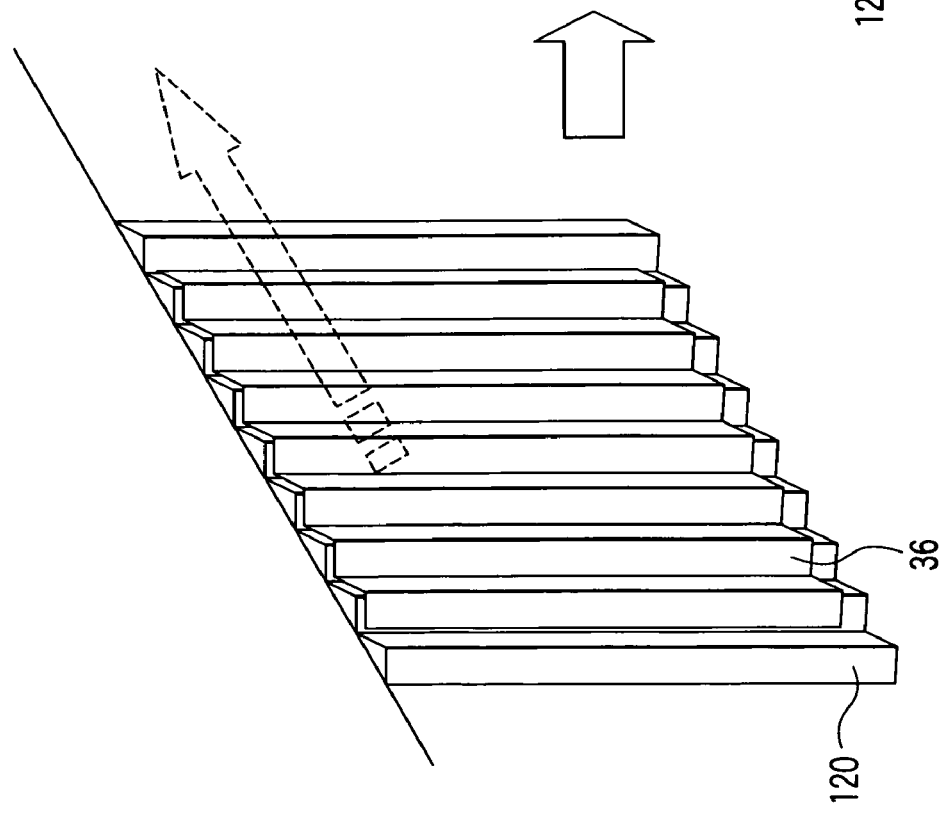
FIG. 26

REFLECTION SCREEN APPARATUS AND PROJECTION SYSTEM USING THE SAME

CROSS-REFERENCE TO RELATED APPLICATIONS

This application is based upon and claims the benefit of priority from prior Japanese Patent Application No. 2003-92072, filed Mar. 28, 2003, the entire contents of which are incorporated herein by reference.

BACKGROUND OF THE INVENTION

1. Field of the Invention

The present invention relates to a reflection screen apparatus which reflects an image projected by a projection apparatus based on optimal light distribution, and to a projection system using the same.

2. Description of the Related Art

A projector of a so-called front projection type uses a reflection screen that reflects a projected image thereof. Various ideas have been tried for the screen so that a brighter light can be obtained for an observer by converging luminous flux reflected by the screen to the observer and reducing useless light reflected to the outside of the observer's visual field as much as possible. Accordingly, many inventions or commercial products have been presented regarding a reflection screen of high directivity in which the reflected light distribution angle of a screen reflection surface is narrowed. As opposed to a conventional white matte screen of a wide light distribution angle, a silver screen, a pearl screen, a bead screen, a hologram screen, etc., can be cited as such representative screens that have been in practical use. Further, various ideas have been presented to increase directivity by a structure such as a shape of a screen reflection surface, e.g., in Jpn. Pat. Appln. KOKAI Publications Nos. 6-242511, 5-45733, 2000-275755, 10-26802, etc. Thus, since the amount of a light can be increased for the observer in a condensed manner by the screen of a small light distribution angle, a demand therefor tends to increase more and more.

Recently, however, widespread use of projectors has increased the need for projection on a large screen even at a place of limited space, consequently increasing short-focus projectors. Thus, an incident angle of a projected luminous flux made incident on a screen end surface inevitably becomes steep on a general plane screen, creating a situation in which a direction itself of the reflected light distribution thereof is shifted more to an area outside the observer. A problem of the impossibility of achieving an original object occurs even on the screen reflection surface of a small light distribution angle.

Thus, Jpn. Pat. Appln. KOKAI Publication No. 5-297466 presents a screen apparatus that has a mechanism for changing light distribution angle characteristics by bending and deforming the entire screen reflection surface to a predetermined curved surface shape. This screen apparatus sets a plane state when observation is carried out at a wide light distribution angle by many people, and changes its state to a curved surface shape when observation is carried out by a small number of people. Additionally, a surface inspection apparatus or the like based on an image obtained by simply making variable a curvature of a curved surface shape of a screen reflection surface and concentrating a reflected light on a predetermined object is presented in Jpn. Pat. Appln. KOKAI Publication No. 8-114430. According to this method, it is possible to effectively provide bright images to an observer by making effective use of screen reflection characteristics of a small light distribution angle.

BRIEF SUMMARY OF THE INVENTION

According to a first aspect of the present invention, there is provided a reflection screen apparatus in which a projection apparatus projects an image based on received image data and an observer observes the image, comprising:

a screen reflection surface which visibly diffuses and reflects the image projected by the projection apparatus to the observer; and a light distribution correction section configured to change a state of a distribution direction of a light reflected on the screen reflection surface so as to more reflect a diffused light reflected on the screen reflection surface to the observer.

According to a second aspect of the present invention, there is provided a projection system comprising:

a projection apparatus which projects an image based on received image data;

a reflection screen apparatus in which an observer observes the image, the reflection screen apparatus including:

a screen reflection surface which visibly diffuses and reflects the image projected by the projection apparatus to the observer; and a light distribution correction section configured to change a state of a distribution direction of a light reflected on the screen reflection surface so as to more reflect a diffused light reflected on the screen reflection surface to the observer, the light distribution correction section changing the state of the light distribution direction and outputting image correction information in accordance with an amount of the change; and an image correction section configured to execute image correction for the image data sent to the projection apparatus based on the image correction information from the light distribution correction section.

According to a third aspect of the present invention, there is provided a reflection screen apparatus in which a projection apparatus projects an image based on received image data and an observer observes the image, comprising:

a screen reflection surface which visibly diffuses and reflects the image projected by the projection apparatus to the observer; and light distribution correction means for changing a state of a distribution direction of a light reflected on the screen reflection surface so as to more reflect a diffused light reflected on the screen reflection surface to the observer.

According to a fourth aspect of the present invention, there is provided a projection system comprising:

a projection apparatus which projects an image based on received image data;

a reflection screen apparatus in which an observer observes the image, the reflection screen apparatus including:

a screen reflection surface which visibly diffuses and reflects the image projected by the projection apparatus to the observer; and light distribution correction means for changing a state of a distribution direction of a light reflected on the screen reflection surface so as to more reflect a diffused light reflected on the screen reflection surface to the observer, the light distribution correction means changing the state of the light distribution direction and outputting image correction information in accordance with an amount of the change; and image correction means for executing image correction for the image data sent to the projection apparatus based on the image correction information from the light distribution correction means.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing a state of using a reflection screen apparatus according to a first embodiment of the present invention, and a projection system that uses the same;

FIG. 2 is a functional block diagram showing a basic configuration of the projection system according to the first embodiment;

FIG. 4 is a functional block diagram showing a constitution for detecting a projected luminous flux incident angle;

FIG. 15A is a view showing a state before deformation for explaining a positional relation between a micro-convex lens for light condensation and a light amount detection sensor according to an eight embodiment of the present invention;

FIG. 15B is a view showing a state after deformation;

FIG. 17 is a view showing a constitution of a micro-lens;

FIG. 18 is a view explaining characteristics of a light absorption area;

FIG. 19 is a view showing a constitution of a screen reflection surface in the case of using a hologram filter;

FIG. 26 is a view explaining a constitution of a screen according to a twelfth embodiment of the present invention.

DETAILED DESCRIPTION OF THE INVENTION

Figure 3:
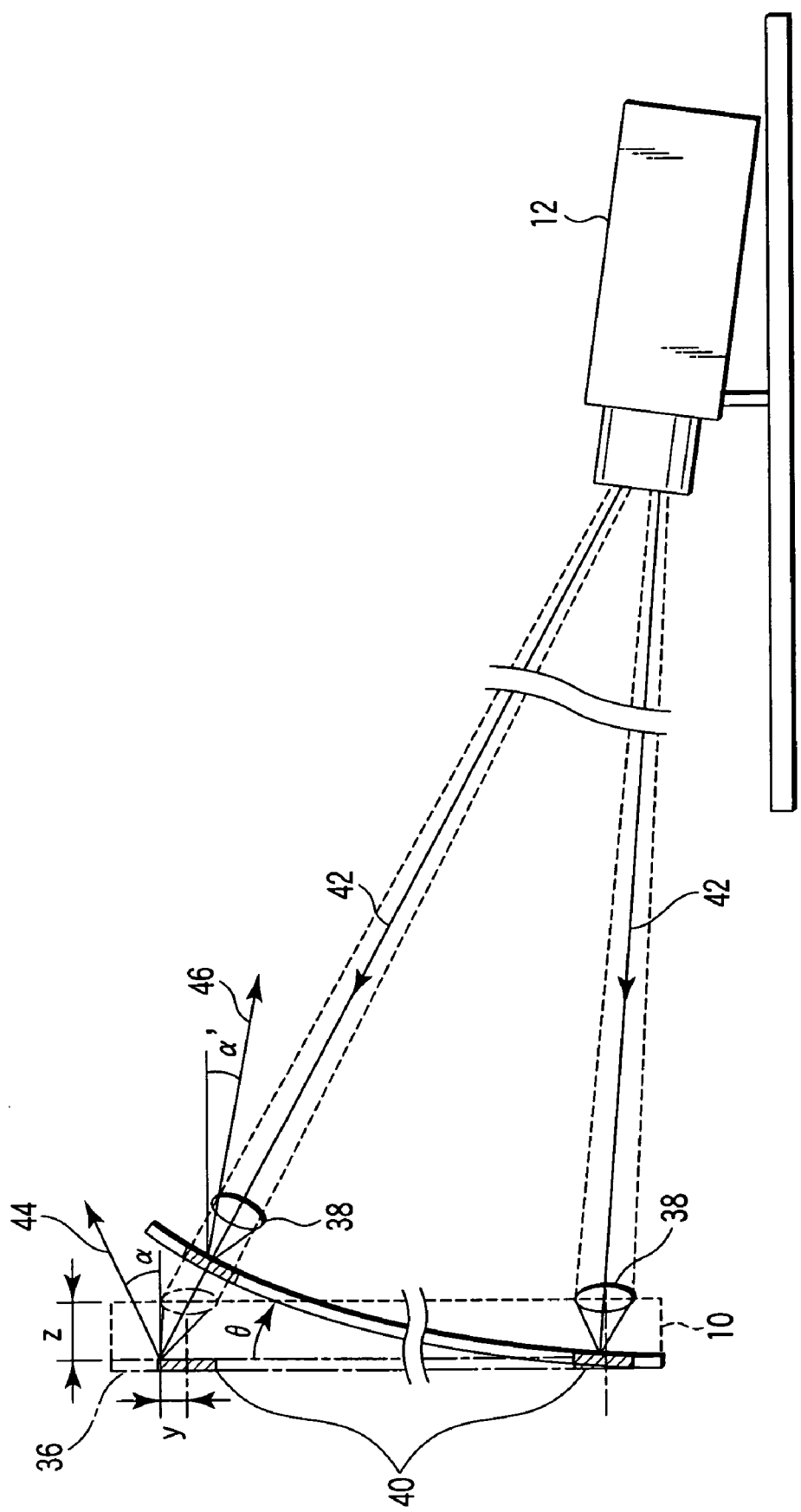
FIG. 3 is a view showing a constitution of a screen according to a second embodiment of the present invention.

Next, the preferred embodiments of the present invention will be described with reference to the accompanying drawings.

First Embodiment

As shown on the left side of FIG. 1, a reflection screen apparatus according to a first embodiment of the present invention has a screen 10. When an image is projected onto the screen 10 by a projection apparatus 12, a projected luminous flux is made incident on a planar screen reflection surface of the screen 10, and reflected as a reflected luminous flux in accordance with a reflected light distribution angle that the screen reflection surface has. Incidentally, in the specification, "light distribution angle" means a diffusing and spreading angle thereof when light rays made incident on the screen are reflected from the same spot of the screen reflection surface. The reflected luminous flux from the screen reflection surface only needs to enter eyes of all observers 14, i.e., an observation area 16 that includes positions of the eyes of all the observers 14. Reflected luminous fluxes on other areas, e.g., a ceiling, a desk, etc., are wasted. Thus, according to the reflection screen apparatus of the embodiment, the screen reflection surface is deformed as shown on the right side of FIG. 1 to condense the reflected luminous flux in the observation area 16, whereby bright images can be effectively provided to the observers 14. As for the deformation, according to the embodiment, the observation area 16 is detected or set to adaptively deform the screen reflection surface, and luminous fluxes reflected on the screen reflection surface are efficiently condensed on the observers 14.

As shown in FIG. 2, a projection system according to the embodiment comprises the reflection screen apparatus 18 of the embodiment, the projection apparatus 12, and an image correction section 20. The reflection screen apparatus 18 comprises a light distribution correction command section 22, a projected luminous flux incident angle detection section 24, an observer covering area setting section 26, a screen light distribution angle memory section 28, and a light distribution correction section 30. The light distribution correction section 30 includes a screen reflection surface deformation control section 32, and a screen reflection surface deformation driving section 34.

Here, the light distribution correction command section 22 of the reflection screen apparatus 18 instructs projection-on to the projection apparatus 12 in accordance with an operation of an operation button (not shown) that the reflection screen apparatus 18 has by an operator (one of the observers 14). In association, a light distribution correction command is output to the projected luminous flux incident angle detection section 24 and the screen reflection surface deformation control section 32. The projected luminous flux incident angle detection section 24 detects an angle of a luminous flux made incident from the projection apparatus 12 on the screen reflection surface 36 of the screen 10 in accordance with the light distribution correction command. By the operation of the operator of the operation button (not shown) that the reflection screen apparatus 18 has, the observer covering area setting section 26 sets an observer covering area that is information of a position in which the plurality of observers 14 including the operator who has executed the operation. Additionally, the screen light distribution angle memory section 28 stores data of a light distribution angle that the screen reflection surface 36 has as reflection characteristics. The screen reflection surface deformation control section 32 controls deformation of the screen reflection surface 36 in accordance with the light distribution correction command from the light distribution correction command section 22. The screen reflection surface deformation driving section 34 drives deformation of the screen reflection surface 36 based on the control of the screen reflection surface deformation control section 32.

Incidentally, in the above constitution, not all of the projected luminous flux incident angle detection section 24, the observer covering area setting section 26, and the screen light distribution angle memory section 28 are necessary. As in the case of each embodiment described below, these sections may be used as occasion demands.

According to the reflection screen apparatus 18 of the foregoing constitution, the screen reflection surface deformation control section 32 calculates an amount of deformation to provide an optimal light distribution to the observer covering area based on at least one of the incident angle of the luminous flux on the screen reflection surface 36 which has been detected by the projected luminous flux incident angle detection section 24, the data of the light distribution angle which the screen reflection surface 36 has as the reflection characteristics and which has been stored by the screen light distribution angle memory section 28, and the setting of the observer covering area by the observer covering area setting section 26. Then, a control amount thereof is provided to the screen reflection surface deformation driving section 34. The screen reflection surface deformation driving section 34 deforms the screen reflection surface 36 based on the control amount. Accordingly, the reflected light is effectively supplied from the screen reflection surface 36 to the observer 14.

Furthermore, according to the projection system of the present invention, the screen reflection surface deformation control section 32 obtains image correction information such as data to correct distortion or nonuniform luminance of the projected image which occurs in accordance with the deformation amount of the screen reflection surface 36, and supplies the information to the image correction section 20. The image correction section 20 executes correction to improve the projected image based on image data input for projection in accordance with the image correction information. Then, the corrected image data is input to the projection apparatus 12 to be projected to the deformed screen reflection surface 36. Thus, even if the screen reflection surface 36 is deformed, the observer 14 can observe an image substantially similar to that in the case of no deformation.

Incidentally, the amount of correction executed in accordance with the deformation amount of the screen reflection surface 36 based on the image correction information is obtained beforehand to be represented in a function or a table. Further, the deformation of the screen reflection surface 36 may be accompanied by a necessity of defocusing correction in addition to the correction of the distortion or the nonuniform luminance. Thus, as a function of the image correction section 20, for example, an automatic lens replacement function or the like may be constituted to execute not only image data correction but also optical defocusing correction.

Therefore, the deformation of the screen reflection surface 36 enables the observer 14 to observe an image substantially similar to that in the case of no deformation but increased in amount.

Needless to say, the image correction section 20 may be incorporated in one of the reflection screen apparatus 18 and the projection apparatus 12.

Second Embodiment

Next, as a second embodiment of the present invention, description will be made of deformation of the screen reflection surface 36 executed in accordance with incident angle detection of a luminous flux by the projected luminous flux incident angle detection section 24.

That is, as shown in FIG. 3, a plurality of sets (N) of micro-convex lenses 38 for light condensation and corresponding light spot position detection sensors 40 are attached to predetermined positions, e.g., inconspicuous positions near an upper end and a lower end, of the screen 10. According to this constitution, a condensing position y of a projected light 42 of the projection apparatus 12 on the light spot position detection sensor 40 by the micro-convex lens 38 for light condensation is changed in accordance with the angle of the projected light 42 made incident from the projection apparatus 12 on the screen reflection surface 36. Thus, it is possible to find out the incident angle of the projected light 42 with respect to the position of the screen reflection surface 36 based on a detection value of the light spot position detection sensor 40.

Incidentally, in FIG. 3, a reference numeral 44 denotes a main reflection optical axis before deformation of the screen reflection surface 36, and a reference numeral 46 denotes a main reflection optical axis after deformation.

Further, as shown in FIG. 4, the projected luminous flux incident angle detection section 24 comprises a projected luminous flux angle calculation section 48 in addition to the light spot position detection sensors 40 (and the microconvex lenses 38 for light condensation). The screen reflection surface deformation control section 32 comprises a screen deformation amount calculation section 50 and a screen reflection surface operation section 52. The projected luminous flux angle calculation section 48 calculates the angle of luminous flux of the projected light 42 made incident on the screen reflection surface 36 based on a detection value y from each light spot position detection sensor 40. Then, the calculated data is output to the screen deformation amount calculation section 50 of the screen reflection surface deformation control section 32. The screen deformation amount calculation section 50 calculates an optimal deformation amount θ of the screen reflection surface 36 based on the calculated data, light distribution angle information from the screen light distribution angle memory section 28, and observer covering area information from the observer covering area setting section 26. Then, the calculated optimal deformation amount is input to the screen reflection surface deformation operation section 52. The screen reflection surface deformation operation section 52 obtains an operation amount to deform the screen 10 in accordance with the input optimal deformation amount, and outputs the operation amount to the screen reflection surface deformation driving section 34.

Thus, according to the embodiment, it is possible to easily detect the angle of the projected luminous flux made incident on the screen reflection surface 36 by detecting the light spot position thereon.

Additionally, a light distribution range of the luminous flux reflected on the screen reflection surface 36 is obtained based on the angle of the projected luminous flux made incident thereon, and the screen reflection surface 36 can be properly deformed to match the range with the area that covers the observers 14. Thus, it is possible to effectively condense the reflected luminous flux of the screen reflection surface 36 on the observers 14.

Incidentally, as shown in FIG. 4, the reflection screen apparatus 18 of the embodiment may further comprise a deformation amount display section 54, a deformation pattern memory section 56, and a deformation pattern selection section 58. That is, the optimal deformation amount θ of the screen reflection surface obtained by the screen deformation amount calculation section 50 is also output to the deformation amount display section 54. Then, the deformation amount display section 54 displays the input optimal deformation amount. Accordingly, the observers 14 can perceive the deformation amount. The deformation pattern memory section 56 prestores typical deformation patterns of the screen reflection surface 36. One of the observers 14 selects a pattern by switch selection or the like at the deformation pattern selection section 58. Upon selection of the deformation pattern, the deformation pattern information is supplied from the deformation pattern selection section 58 to the screen reflection surface deformation operation section 52. The screen reflection surface deformation operation section 52 obtains an operation amount corresponding to the deformation pattern information, and sends the operation amount to the screen reflection surface deformation driving section 34. Further, the observer 14 may optionally select an easily seen deformation pattern.

Third Embodiment

As in the case of the second embodiment, a third embodiment concerns deformation of the screen reflection surface 36 executed in accordance with the incident angle detection of the luminous flux by the projected luminous flux incident angle detection section 24.

Figure 5:
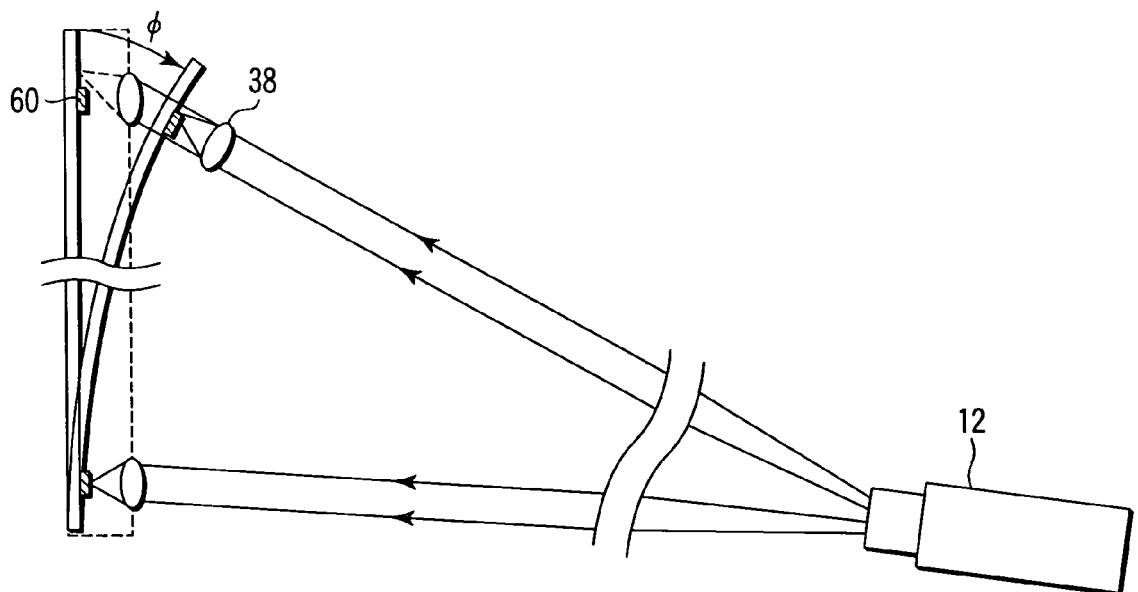
FIG. 5 is a view showing a constitution of a screen according to a third embodiment of the present invention.

As shown in FIG. 5, according to the embodiment, a light amount detection sensor 60 is used in place of the light spot position detection sensor 40 of the second embodiment. Additionally, according to the embodiment, the projected luminous flux angle calculation section 48 of the projected luminous flux incident angle detection section 24 stores the relation between the detected light amount of the light amount detection sensor 60 and the incident angle of the projected luminous flux as foresighted information. Accordingly, the projected luminous flux angle calculation section 48 can easily find out the incident angle of the projected luminous flux based on the detected light amount of the light amount detection sensor 60. As a result, as in the case of the second embodiment, the angle of the projected luminous flux made incident on the screen reflection surface 36 can be calculated to be output to the screen deformation amount calculation section 50 of the screen reflection surface deformation control section 32.

Thus, according to the embodiment, it is possible to easily detect the angle of the projected luminous flux made incident on the screen reflection surface 36. Moreover, a light distribution range of the reflected luminous flux on the screen reflection surface 36 is obtained based on the incident angle of the projected luminous flux thereon, and the screen reflection surface 36 can be properly deformed to match the range with the area that covers the observers 14. As a result, it is possible to effectively condense the reflected luminous flux of the screen reflection surface 36 on the observers 14.

Figure 6:
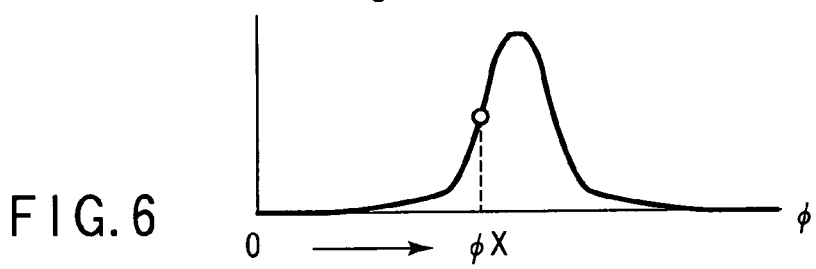
FIG. 6 is a view showing a relation between an amount of a detected light and a deformation angle of a screen reflection surface.

Incidentally, in place of the processing through the projected luminous flux angle calculation section 48, the detected light amount of the light amount detection sensor 60 may be directly supplied to the screen deformation amount calculation section 50 of the screen reflection surface deformation control section 32. In this case, the screen deformation amount calculation section 50 stores the relation between the detected light amount and the deformation angle $\phi$ of the screen reflection surface 36 which is similar to that shown in FIG. 6 as foresighted information, and $\phi=\phi x$ is preset as an optimal deformation angle of the screen reflection surface 36. Thus, the screen deformation amount calculation section 50 can calculate an optimal deformation amount of the screen reflection surface 36 based on a difference between the deformation angle corresponding to the detected light amount detected by the projected luminous flux incident angle detection section 24 and the optimal deformation angle $\phi x$.

Fourth Embodiment

A fourth embodiment concerns deformation control amount calculation of the screen reflection surface 36 by the screen reflection surface deformation control section 32.

Figure 7:
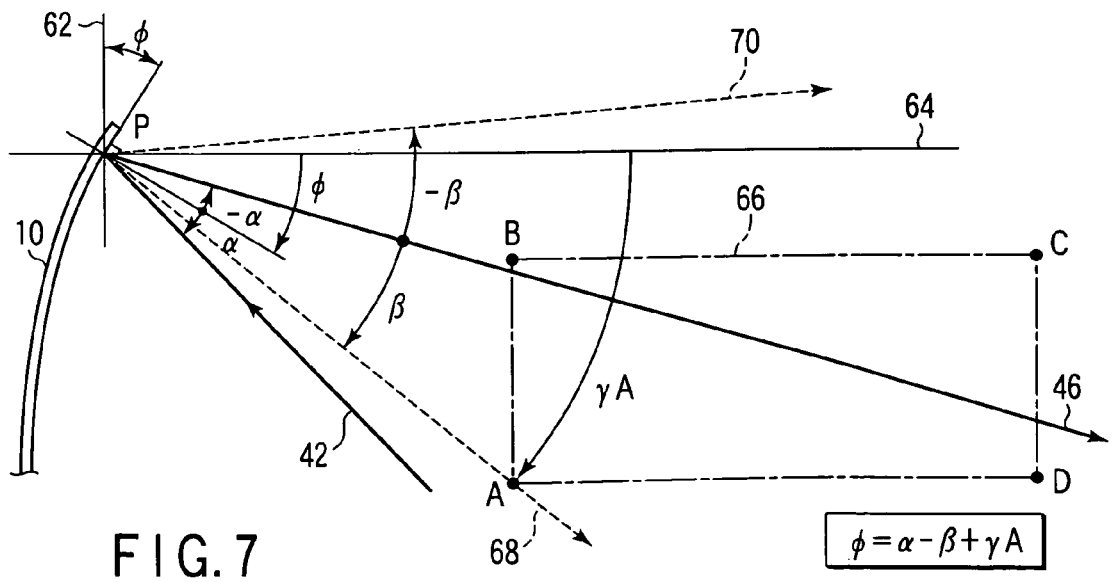
FIG. 7 is a view explaining each parameter in an estimation equation for calculating an amount of deformation control at a screen reflection surface deformation control section according to a fourth embodiment of the present invention.

An estimation equation for deformation control amount calculation at the screen reflection surface deformation control section 32 will be described by referring to FIG. 7. This estimation equation is a setting example at a screen position P. In the drawing, the reference numeral 62 denotes a vertical reference line at the screen position P, and the reference numeral 64 denotes a horizontal reference line at the same.

Now, it is assumed that apexes of a virtual space which defines an observer covering area 66 set by the observer covering area setting section 26 are A, B, C and D. Additionally, it is assumed that an incident angle (angle formed with a normal direction of the screen reflection surface 36) of the projected light 42 detected by the projected luminous flux incident angle detection section 24 is α, a half of a maximum screen light distribution angle (defined by a kind of the screen 10, and stored in the screen light distribution angle memory section 28) is β, and an angle formed between a maximum light distribution boundary 68 (AP) and the horizontal reference line 64 is γA. Then, an angle φ of screen inclination (uppermost projected portion) that is a deformation control amount can be obtained by the following equation:

$$\phi = \alpha - \beta + \gamma A$$

Incidentally, the "light distribution angle" means the diffusing and spreading angle thereof when light rays made incident on the screen 10 are reflected from the same spot of the screen reflection surface 36. The "maximum light distribution angle" means the angle formed between light rays of half-value brightness which sandwich a main reflection optical axis 46 of highest brightness among reflected lights from the same spot of the screen reflection surface 36. The "maximum light distribution boundary" means the position of the light rays of the half-value brightness. Reference numeral 70 denotes the other maximum light distribution boundary. The "half-value brightness" is not necessarily a half value. The value may properly be defined based on a designing idea.

Furthermore, in addition to the aforementioned example, matching of the maximum light distribution boundary 68 with one of the apexes of the virtual space that defines the observer covering area based on a relation between a size of the light distribution angle and a size of the observer covering area 66 may be decided on a case-by-case basis.

Thus, it is possible to easily calculate a deformation control amount by using the estimation equation.

Fifth Embodiment

A fifth embodiment concerns deformation of the screen reflection surface 36 by the screen reflection surface deformation driving section 34.

Figure 8:
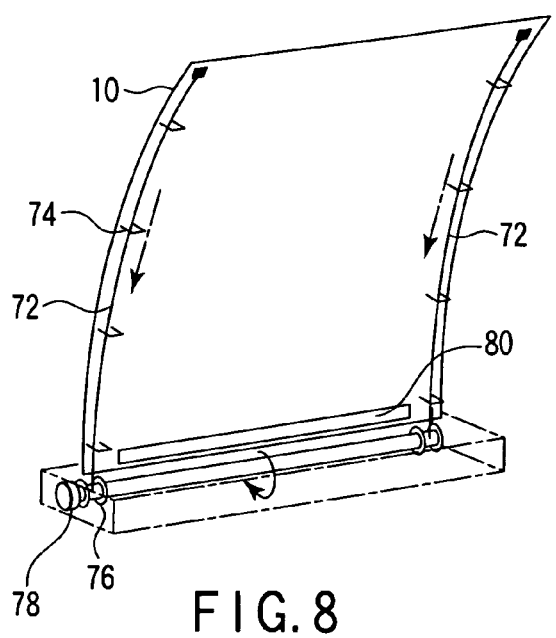
FIG. 8 is a perspective view showing a deformation mechanism of a screen reflection surface deformation driving section according to a fifth embodiment of the present invention.

The screen 10 has spring characteristics, and is constituted to hold an erected spread state even if there is no special holding mechanism. Then, as shown in FIG. 8, deformation wires 72 are passed through wire guides 74 arranged along both left and right ends of the screen 10. One end of each deformation wire 72 is fixed to an upper end position of the screen 10, while the other end side is fixed to a winding bobbin 76 attached to a rotary shaft of a rotary motor 78. The wire guide 74 allows free screen up-and-down movement of the deformation wire 72, but regulates screen left-and-right, and forward movement thereof within a predetermined range. Thus, the rotary motor 78 is rotated to wind the deformation wire 72 on the winding bobbin 76, whereby the screen upper end to which one end of the deformation wire 72 has been fixed is pulled downward to bend and deform the screen 10.

Figure 9:
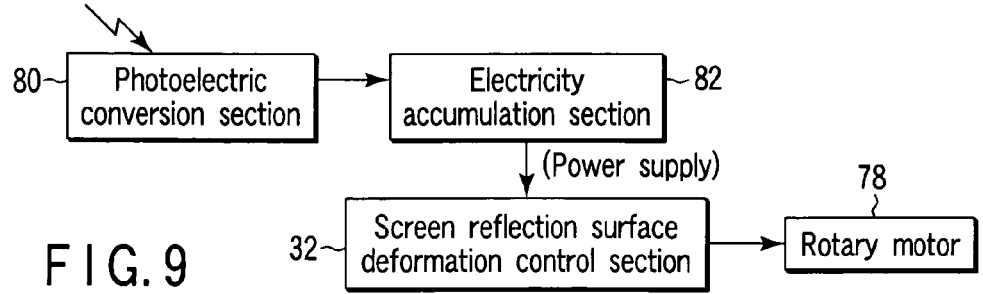
FIG. 9 is a block constitutional diagram of the screen reflection surface deformation driving section.

Additionally, a photoelectric conversion section 80 is arranged near the lower end of the screen 10 to convert the projected light 42 into power. As shown in FIG. 9, the power obtained by the photoelectric conversion section 80 is stored in an electricity accumulation section 82 to be used as a power supply for each section of the reflection screen apparatus which includes the screen reflection surface deformation control section 32.

Thus, according to the embodiment, the light projected to the screen reflection surface 36 is converted into power by the photoelectric conversion section 80, and the power is used as a driving power supply for the mechanism of changing the light distribution direction state of the screen reflection surface 36. Therefore, there is no need to prepare another power supply for the mechanism of changing the light distribution direction state of the screen reflection surface 36, which contributes to energy saving.

Figure 10:
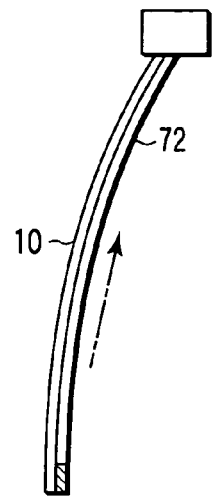
FIG. 10 is a view showing a constitution in the case of ceiling suspension.

Incidentally, as shown in FIG. 10, it is needless to say that the constitution of FIG. 8 can be set upside down to be used as a screen of a ceiling suspension type.

Furthermore, the screen deformation mechanism is not limited to the type that uses the deformation wires 72. Needless to say, for example, the present invention can be applied to various deformation mechanisms such as deformation by an extrusion mechanism from the back of the screen reflection surface to the projection apparatus side.

Sixth Embodiment

A sixth embodiment is designed in such a manner that a light amount is detected at a position of the observer 14 to accordingly deform the screen reflection surface 36.

Figure 11:
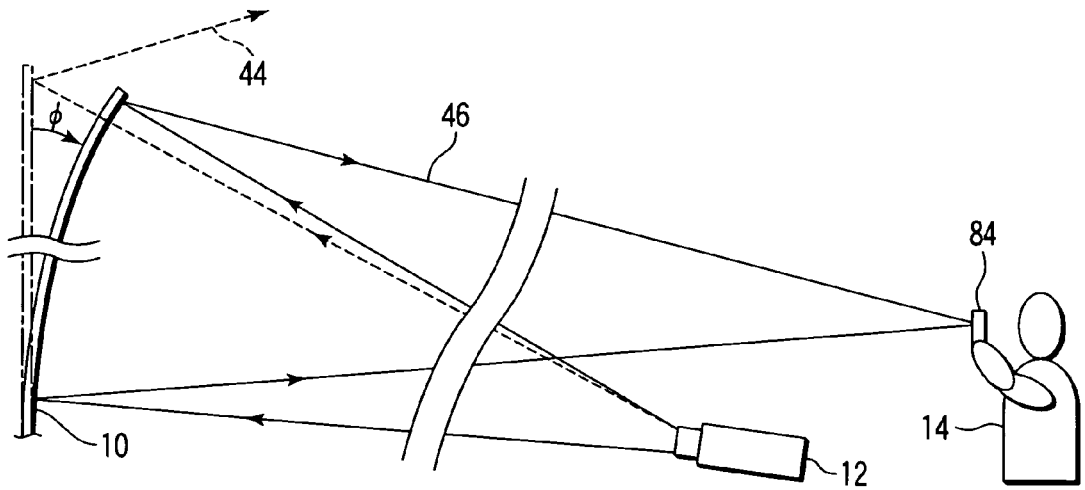
FIG. 11 is a view showing a state of using a remote controller with a built-in photodetection sensor for explaining position measurement of an observer who uses the remote controller with the built-in photodetection sensor according to a sixth embodiment of the present invention.

That is, a photodetection sensor is incorporated in a remote controller that is a remote operation member of the reflection screen apparatus. Then, as shown in FIG. 11, an amount of a reflected light from the screen 10 is measured by the remote controller 84 with the built-in photodetection sensor. As a matter of course, the photodetection sensor should be set at a position in which the observer 14 can visually observe a projected image most brightly. Thus, as shown in FIG. 11, the observer 14 simply holds the remote controller 84 with the built-in photodetection sensor by hand to set a state at a visual position.

Figure 12:
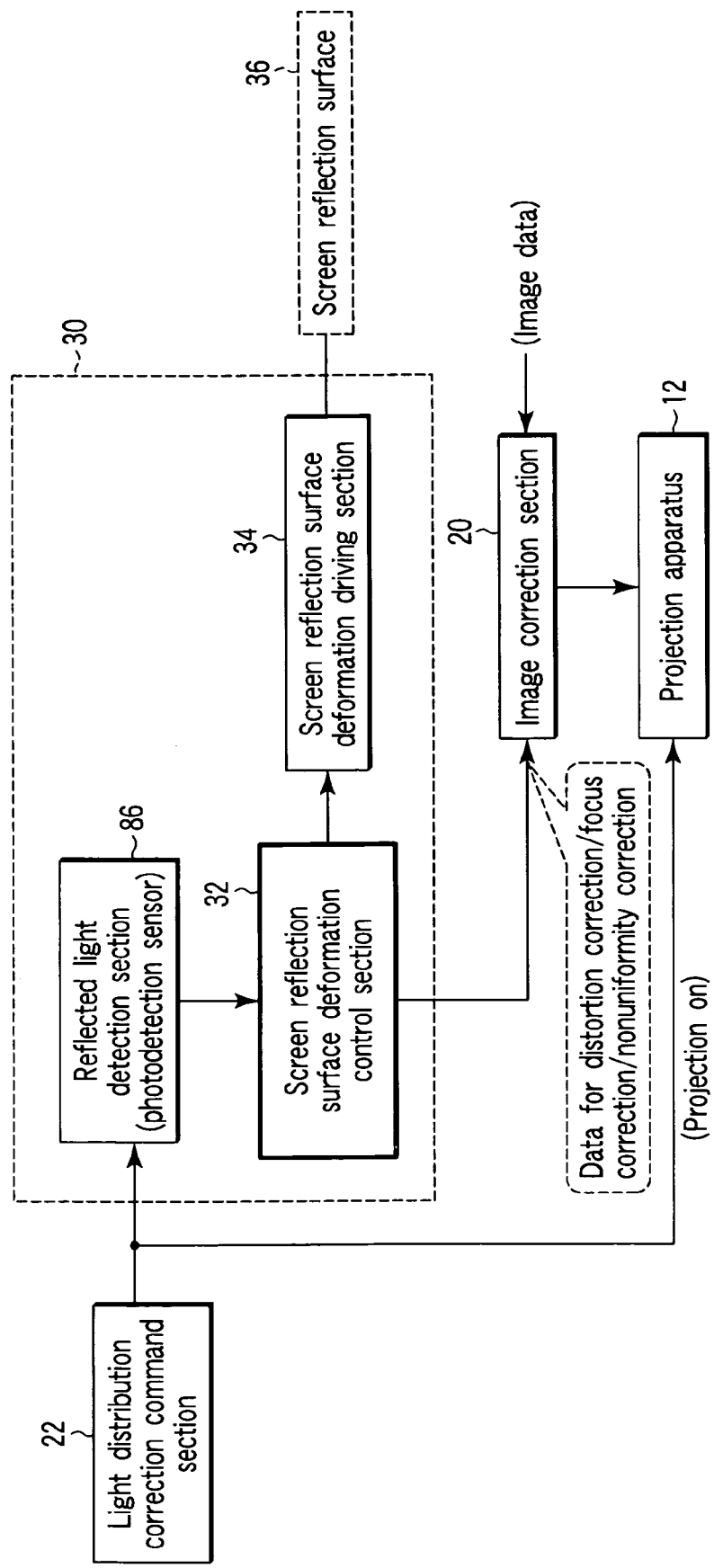
FIG. 12 is a functional block diagram showing a configuration of a projection system that uses the remote controller with the built-in photodetection sensor.

In the case of using such a remote controller 84 with the built-in photodetection sensor, a reflected light detection section 86 is disposed as a photodetection sensor in the light distribution correction section 30 as shown in FIG. 12 in place of the projected luminous flux incident angle-detection section 24 in the basic constitution shown in FIG. 2. Then, the reflected light detection section 86 and the operation section that includes the light distribution correction command section 22 or the like are arranged in the remote controller 84 with the built-in photodetection sensor. In this case, incidentally, the reflected light detection section 86 is connected to the screen reflection surface deformation control section 32 by wireless or the like.

According to the described constitution, the observer 14 holds the remote controller 84 with the built-in photodetection sensor by hand to set the state at the visual position, and executes a predetermined key operation to issue a light distribution correction command from the light distribution correction command section 22. An image white on the full surface or a certain static image is projected from the projection apparatus 12 in accordance with the light distribution correction command. In association, the amount of a reflected light of the projected image on the screen reflection surface 36 is detected by the reflected light detection section 86 of the remote controller 84 with the built-in photodetection sensor. Subsequently, the result of the detection is transmitted to the screen reflection surface deformation control section 32 by wireless or the like. Thus, each section after the screen reflection surface deformation-control section 32 executes the aforementioned operation to deform the screen reflection surface 36.

Incidentally, if there are a plurality of observers 14, preferably, photodetection sensors are set at positions of all the observers to carry out detection in a time division manner, and a deformation amount of the screen reflection surface 36 is decided so that all difference values among obtained light amount signals can become minimum. That is, in the case of one observer 14, deformation control may be carried out so that the light amount detected by the photodetection sensor (reflected light detection section 86) can take a maximum value. On the other hand, in the case of the plurality of observers 14, deformation control is carried out so that a difference between the detected light amounts can become minimum. This processing is for the purpose of preventing generation of a difference in brightness of the projected image among the target observers 14 as much as possible.

According to the sixth embodiment, it is possible to surely condense the reflected luminous flux of the screen reflection surface in the area that includes (the plurality of) the observers by holding the photodetection sensor at (each) the observer or the like to set the position of (each) the photodetection sensor substantially identical to that of (each) the observer.

Incidentally, according to the embodiment, the reflected light detection section 86 is incorporated in the remote controller 84 with the built-in photodetection sensor, and connected to the screen reflection surface deformation control section 32 by wireless or the like. Needless to say, however, the screen reflection surface deformation control section 32 may be incorporated in the remote controller 84 with the built-in photodetection sensor. In this case, the screen reflection surface deformation control section 32, the screen reflection surface deformation driving section 34 and the image correction section 20 are interconnected by wireless or the like.

Seventh Embodiment

As opposed to the sixth embodiment, a seventh embodiment is designed in such a manner that a light is emitted from the position of the observer 14, the light is received at the position of the screen reflection surface 36 to detect the position of the observer, and an observer covering area is accordingly set to deform the screen reflection surface 36.

Figure 13:
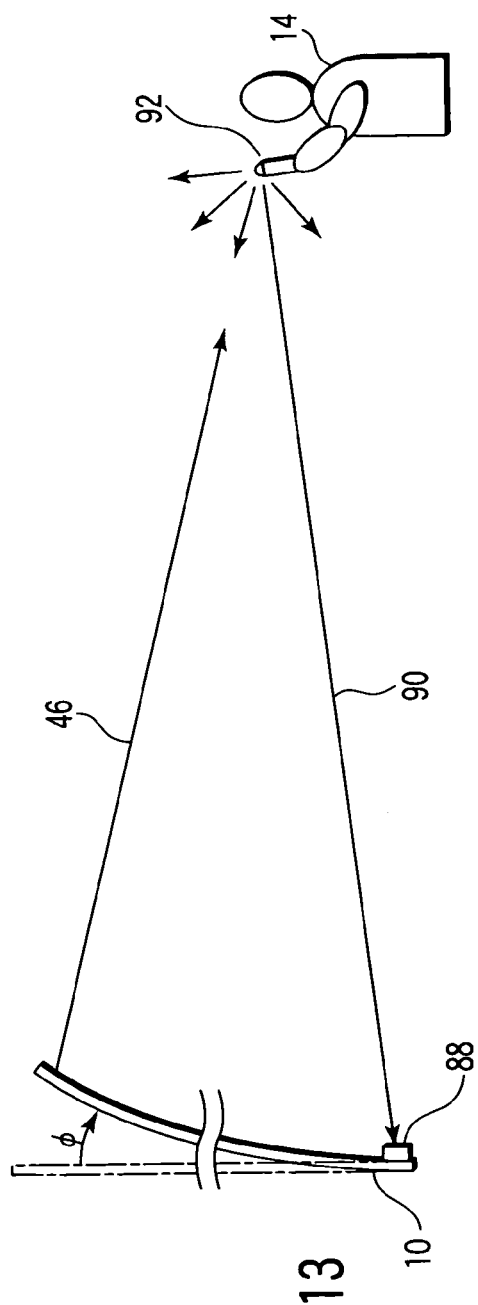
FIG. 13 is a view showing a state of using a remote controller with a built-in marker for explaining setting of an observer covering area which uses the remote controller with the built-in marker according to a seventh embodiment of the present invention.
Figure 14:
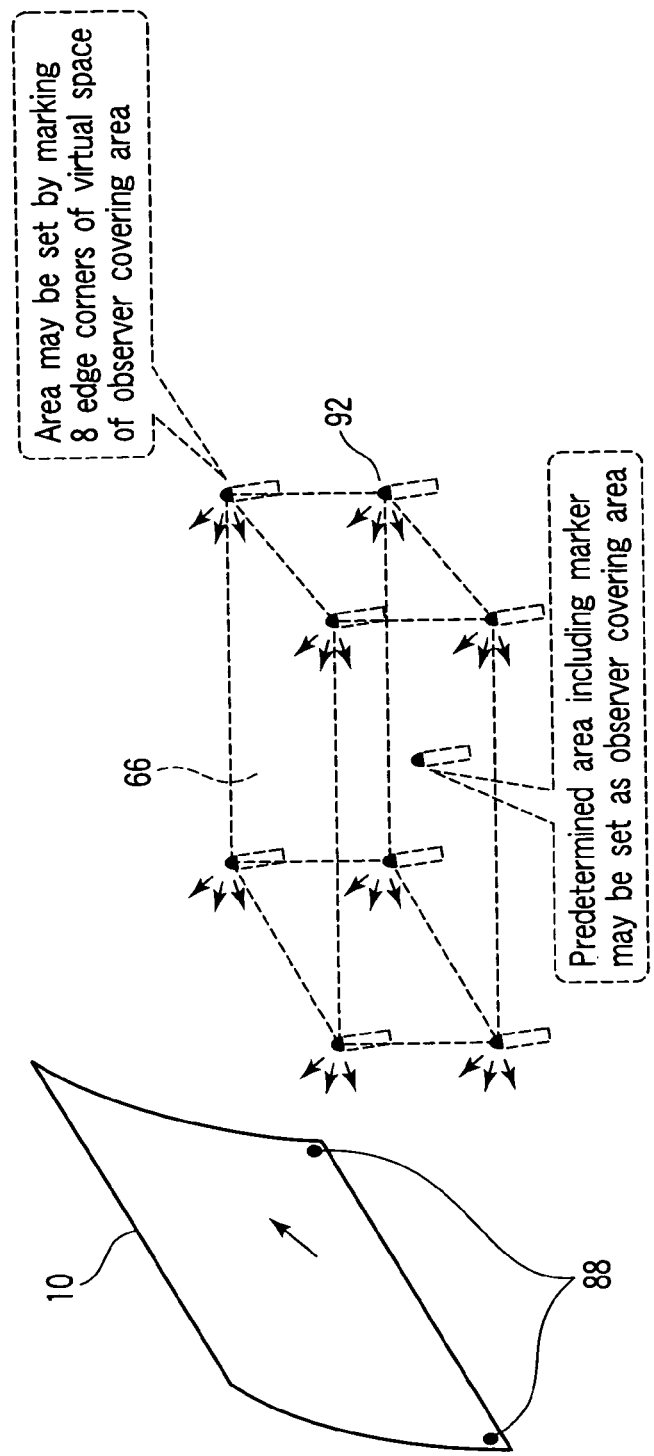
FIG. 14 is a view explaining a relation between a position of the remote controller with the built-in marker and the observer covering area.

That is, as shown in FIG. 13, a marker light spot position detection sensor 88 detects a luminous flux 90 from a luminous body (not shown) as a marker that is incorporated in a remote controller 92 with a built-in marker. Then, the screen reflection surface deformation control section 32 obtains the position of an emission point thereof by calculation. The marker light spot position detection sensor 88 generally comprises an image-forming lens and a light spot position sensor (not shown). In this example, the marker light spot position detection sensor 88 is arranged on a fixed screen lower part or the like of no relation to deformation so as to facilitate detection. If two sets of marker light spot position sensors 88 of such a constitution are arranged at a predetermined interval as shown in FIG. 14, it is possible to specify a spatial position of a marker light spot by using a triangulation principle. Needless to say, the marker should be set at a position in which the observer can visually observe the projected image most brightly, and the observer simply holds the marker to set a state at the visual position.

Thus, the light emitted from the marker is received to obtain a coordinate position thereof relative to the screen reflection surface 36, and the observer covering area 66 is set based on the obtained coordinate position. Therefore, it is possible to accurately set the observer covering area 66 in which the observer 14 is present. Additionally, in this case, a space that has a predetermined spatial spread including the detected marker coordinate may be set as an observer covering area. In this way, even if there are a plurality of observers around the marker position, the space that includes the plurality of observers can be set as an observer covering area. As a result, it is possible to surely condense the reflected luminous flux of the screen reflection surface on the plurality of observers.

Needless to say, if there are a plurality of observers, markers may be arranged at positions of all the observers in a time division manner to set the observer covering area 66. Alternatively, as shown in FIG. 14, markers may be arranged at eight edge corners of a virtual space of the observer covering area 66 in a time division manner to set the same. Thus, it is possible to set the observer covering area 66 more accurately by setting the space surrounded with a plurality of marker coordinates as the observer covering area 66.

It goes without saying that the marker is not limited to the type which uses a light, but may be a type which uses a generally used ultrasonic sound wave, electromagnetic wave or the like.

Eight Embodiment

According to the third embodiment, the light amount is detected on the screen reflection surface 36 to detect the incident angle of the projected luminous flux, and the deformation amount of the screen reflection surface 36 is accordingly decided.

On the other hand, according to the eighth embodiment, a light amount is detected while the screen reflection surface 36 is deformed, and a deformed state thereof is held when a predetermined light amount is obtained. That is, the micro-convex lens 38 for light condensation and the light amount detection sensor 60 are attached to the screen 10 in a relative positional relation in which a focusing point by the micro-convex lens 38 for light condensation is not matched with the light amount detection sensor 60 in a state before deformation as shown in FIG. 15A, and matched therewith in a state after deformation as shown in FIG. 15B. According to such a constitution, when the screen reflection surface 36 is gradually deformed, the focusing point by the projected light 42 from the projection apparatus 12 is gradually shifted. When the focusing point is matched with the light amount detection sensor 60 at a predetermined position, deformation of an angle $\phi$ has been achieved by this time in which a reflected light from the screen reflection surface 36 is directed to a predetermined observer covering area 66. Thus, it is only necessary to hold this deformed state.

Ninth Embodiment

Figure 16A:
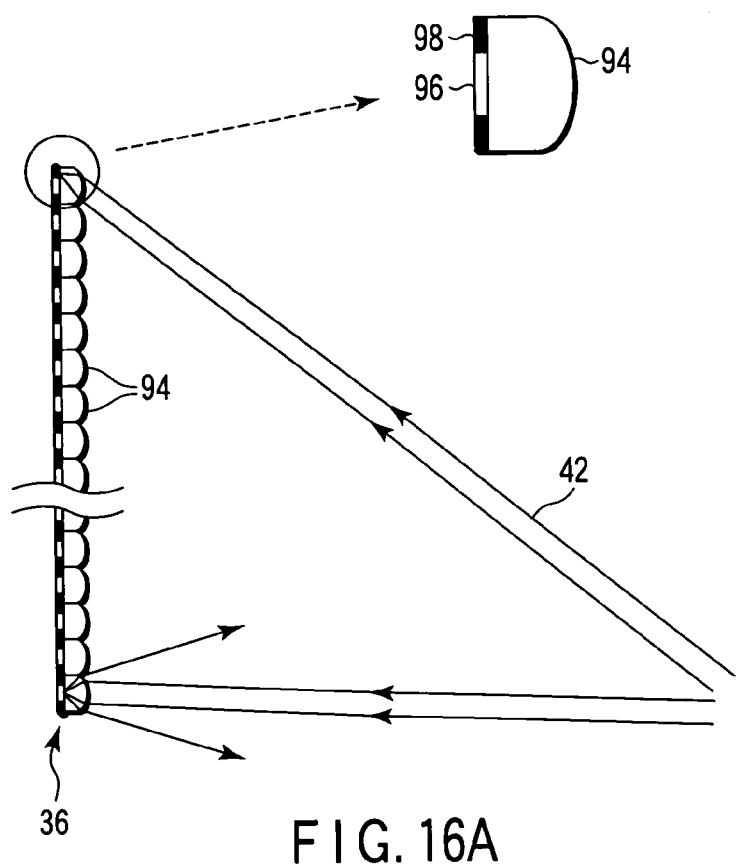
FIG. 16A is a view showing a state before deformation for explaining a constitution of a screen reflection surface according to a ninth embodiment of the present invention.

As shown in FIG. 16A, there is known an apparatus in which the screen reflection surface 36 is constituted by two-dimensionally arranging a micro-lens 94. Here, a reflection and diffusion area 96 surrounded with a light absorption area (black area) 98 is constituted on an image forming surface of the micro-lens 94. On the screen reflection surface 36 of such a constitution, a light condensed in the reflection and diffusion area 96 by the micro-lens 94 is reflected and diffused therein to go out of the micro-lens 94. On the other hand, a light condensed in the light absorption area 98 is absorbed therein.

Figure 16B:
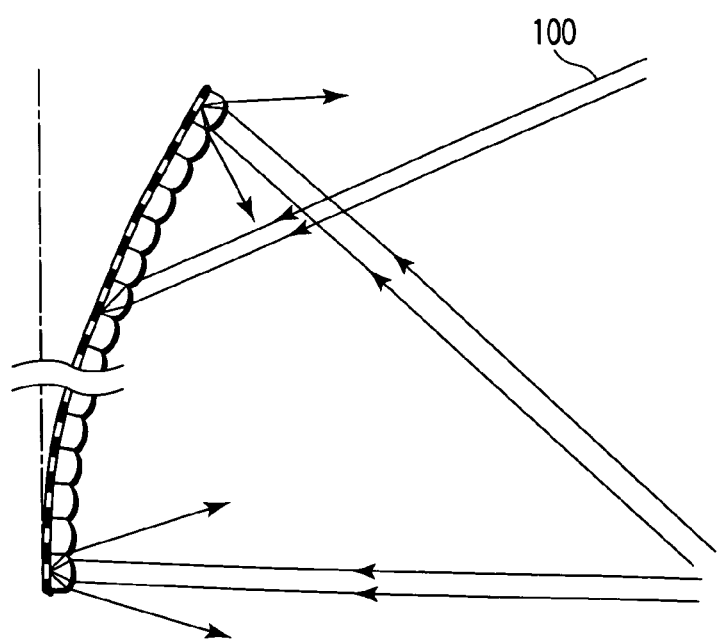
FIG. 16B is a view showing a state after deformation.

If the screen reflection surface 36 is constituted by two-dimensionally arranging such a micro-lens 94, when it is deformed as shown in FIG. 16B, even the projected light 42 absorbed in the light absorption area 98 before deformation can be condensed in the reflection and diffusion area 96.

Thus, the light is reflected and diffused by the reflection and diffusion area 96 to go out of the micro-lens 94, and to be observed by the observer 14. Besides, there is no influence of an external light 100 from a ceiling illumination lamp or the like since it is absorbed in the light absorption area 98.

In the micro-lens 94, a wavelength selection reflection and diffusion film 102 shown in FIG. 17 may be constituted in place of the reflection and diffusion area 96. As shown in FIG. 18, the wavelength selection reflection and diffusion film 102 has characteristics of reflecting and diffusing only predetermined wavelengths, i.e., wavelengths R, G and B of the projected light 42, but not other light of a non-reflection wavelength area 104. Accordingly, even if the external light 100 from the illumination lamp of the like is condensed on a portion other than the light absorption area 98, the light is not reflected/diffused, and thus a screen reflection surface 36 difficult to be influenced by the external light 100 can be formed.

In FIG. 17, reference numeral 106 denotes a projected luminous flux, and reference numeral 108 denotes a reflected and diffused luminous flux.

Additionally, in place of the micro-lens 94 equipped with the wavelength selection reflection and diffusion film 102, as shown in FIG. 19, a hologram filter 110 may be used which comprises wavelength selection reflection and diffusion film 112 in which areas are arrayed to individually reflect and diffuse R, G and B. That is, as shown, the hologram filter 110 can spatially separate focusing points by wavelengths. Accordingly, if the wavelength selection reflection and diffusion film 112 in which the areas are arranged to reflect and diffuse the corresponding R, G and B wavelengths is constituted at a position of each focus, it is possible to obtain operational effects similar to those of the micro-lens 94 equipped with the wavelength selection reflection and diffusion film 102 shown in FIG. 17.

Tenth Embodiment

Figure 20:
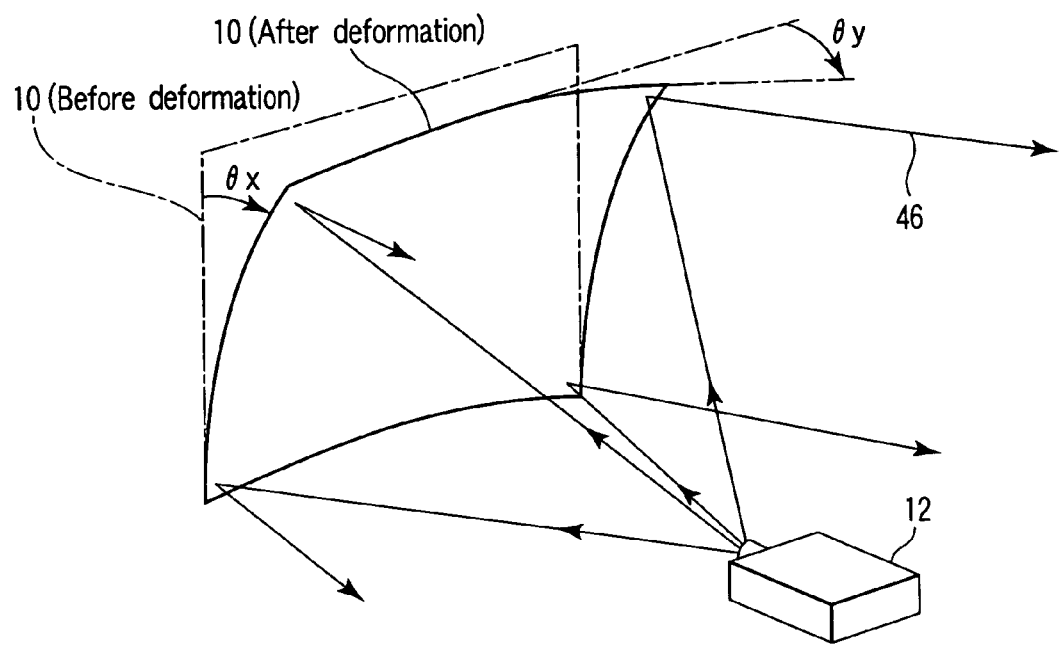
FIG. 20 is a view explaining a deformation direction of a screen reflection surface according to a tenth embodiment of the present invention.

Thus far, description has been made of one-dimensional deformation which deforms the upper end side of the screen reflection surface 36 toward the observer as the deformation direction thereof. However, the present invention is not limited to such. Needless to say, two-dimensional deformation may be carried out as indicated by θx, θy of FIG. 20.

The two-dimensional deformation that bends the screen reflection surface 36 in a concave shape enables more effective condensation of the reflected luminous flux thereof on the observer 14.

Eleventh Embodiment

Thus far, description has been made of deformation of the entire screen reflection surface 36. However, the present invention is not limited to such. Needless to say, the screen reflection surface 36 may be locally deformed.

Figure 21:
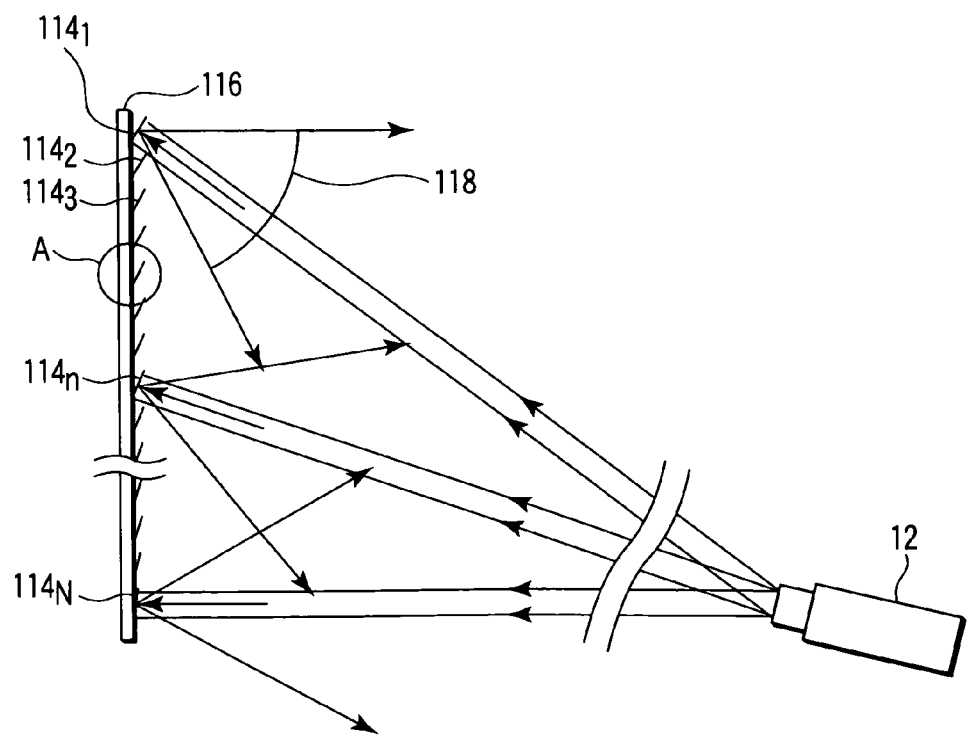
FIG. 21 is a view explaining a constitution of a screen reflection surface according to an eleventh embodiment of the present invention.

That is, as shown in FIG. 21, the screen reflection surface 36 is constituted by arranging a plurality of micro-diffusion and reflection surfaces 114 (114₁, 114₂, . . . , 114ₙ) on a screen base 116. The micro-diffusion and reflection surfaces 114 are movable. Thus, it is possible to change a state of a distribution direction of a light reflected on the screen reflection surface 36 by moving the micro-diffusion and reflection surfaces 114.

According to such a constitution, finer control can be carried out by micro-diffusion and reflection surface units. Incidentally, in FIG. 21, a reference numeral 118 denotes a screen reflected light distribution angle.

Some constitutional examples for moving the micro-diffusion and reflection surfaces 114 will be described.

First, a charged film/thin film system will be described by referring to FIG. 22. The drawing is an expanded view (equivalent view) of an A portion of FIG. 21, showing only one micro-diffusion and reflection surface 114 (similar in FIGS. 23 to 25).

Figures 22, 23:
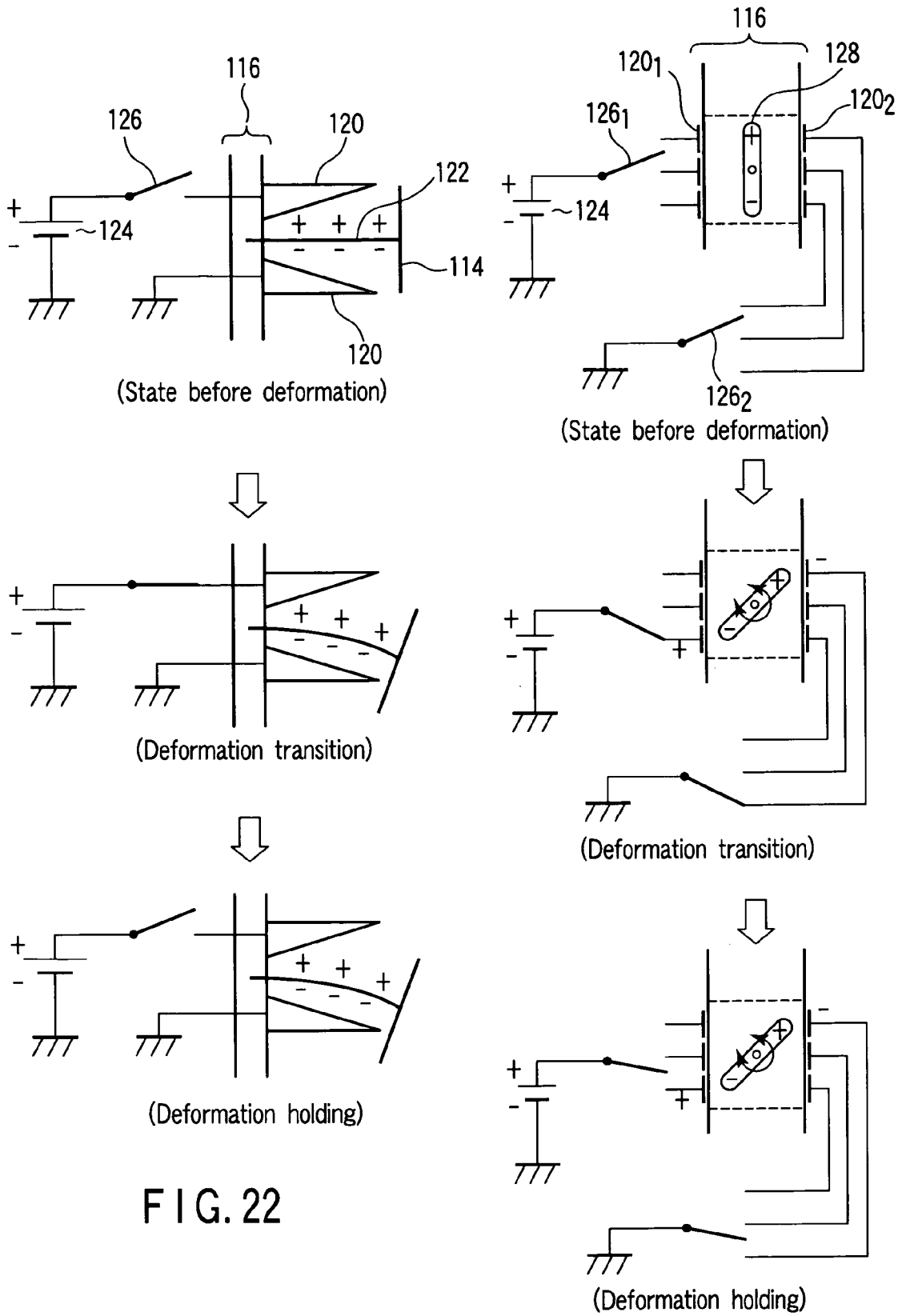
FIG. 22 is an expanded view (equivalent view) of an A portion of FIG. 21 in the case of a charged film/thin plate system.
FIG. 23 is an expanded view (equivalent view) of the A portion of FIG. 21 in the case of a charged rotary plate system.

That is, as shown in FIG. 22, two fixed electrodes 120 are attached to the screen base 116. Further, one side face of a charged movable plate 122 one surface of which is charged "+" and the other surface of which is charged "−" is attached between the fixed electrodes 120. Then, the micro-diffusion and reflection surface 114 is arranged on a free side face of the charged movable plate 122. Additionally, one of the fixed electrodes 120 is connected through a switch 126 to a power source 124, while the other is grounded.

According to such a constitution, the switch 126 is off in a state before deformation. At the time of transition to deformation, the switch 126 is turned on to apply "+" to the fixed electrode 120 opposite the "+" charged side of the charged movable plate 122. Accordingly, the charged movable plate 122 is deformed by repulsion of charges, which is accompanied by a change in inclination angle of the micro-diffusion and reflection surface 114. Then, when a desired angle is reached, the switch 126 is turned off to hold the deformed state.

FIG. 23 is a view showing a constitution in the case of a charged rotary plate system. In this case, a charged rotary plate 128 that has a surface to become the micro-diffusion and reflection surface 114 is rotatably attached in the screen base 116. One side face of the charged rotary plate 128 is charged "+" while the other side face is charged "−". Then, three fixed electrodes 120₁, and three fixed electrodes 120₂ are disposed on the screen base 116 sandwiching the charged rotary plate 128. In this case, the fixed electrode 120₂ that becomes an observer side is constituted as a transparent electrode. The three fixed electrodes 120₁ are selectively connected through a switch 126₁ to the power source 124, while the three fixed electrodes 120₂ are selectively grounded through a switch 126₂. The switches 126₁ and 126₂ are linked with each other. However, the fixed electrodes 120₁, 120₂ and the switches 126₁, 126₂ are connected so that uppermost one of the three fixed electrodes 120₁ and lowermost one of the three fixed electrodes 120₂ can be simultaneously selected, middle one of the fixed electrodes 120₁ and middle one of the fixed electrodes 120₂ can be simultaneously selected, and lowermost one of the fixed electrodes 120₁ and uppermost one of the fixed electrodes 120₂ can be simultaneously selected.

Thus, according to such a constitution, the switches 126₁, 126₂ are both off in a state before deformation. At the time of transition to deformation, the switch 126₁ is switched to set a state of connecting the lowermost fixed electrode 120₁ to the power source 124, while the switch 126₂ is switched to set a state of grounding the uppermost fixed electrode 120₂. Then, the "−" charged side face of the charged rotary plate 128 is pulled to the lowermost fixed electrode 120₁ side, while the "+" charged side face is pulled to the uppermost fixed electrode 120₂ side. Accordingly, the charged rotary plate 128 is rotated to change the inclination angle of the micro-diffusion and reflection surface 114. Then, when a desired angle is reached, the switches 126₁, 126₂ are both turned off to hold the deformed state.

As a result, it is possible to hold the deformation of the micro-diffusion and reflection surface 114 by an electrostatic force.

Figure 24:
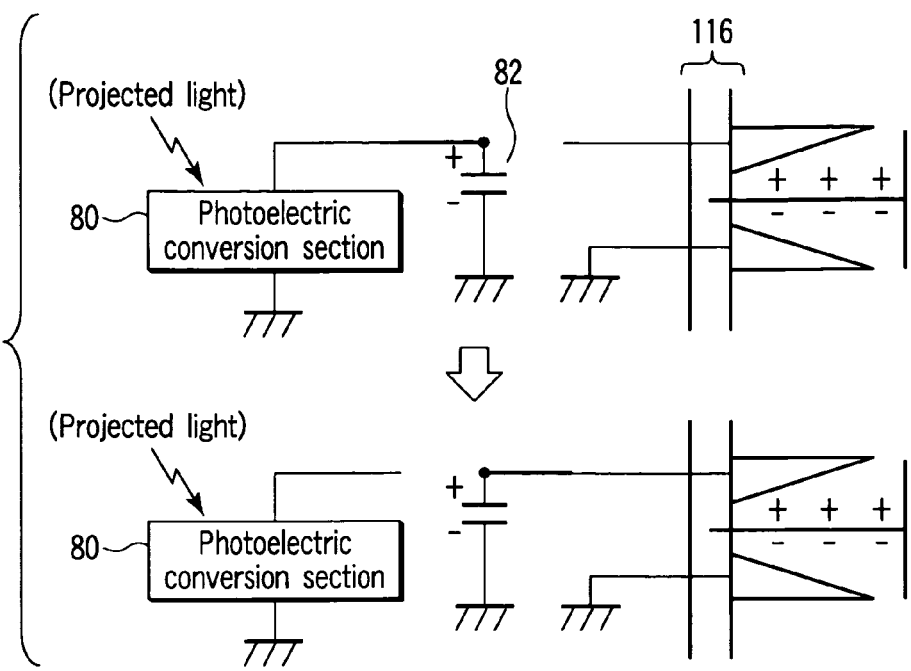
FIG. 24 is a view showing a modified example of a constitution of FIG. 22 in the case of using a photoelectric conversion section and an electricity accumulation section.
Figure 25:
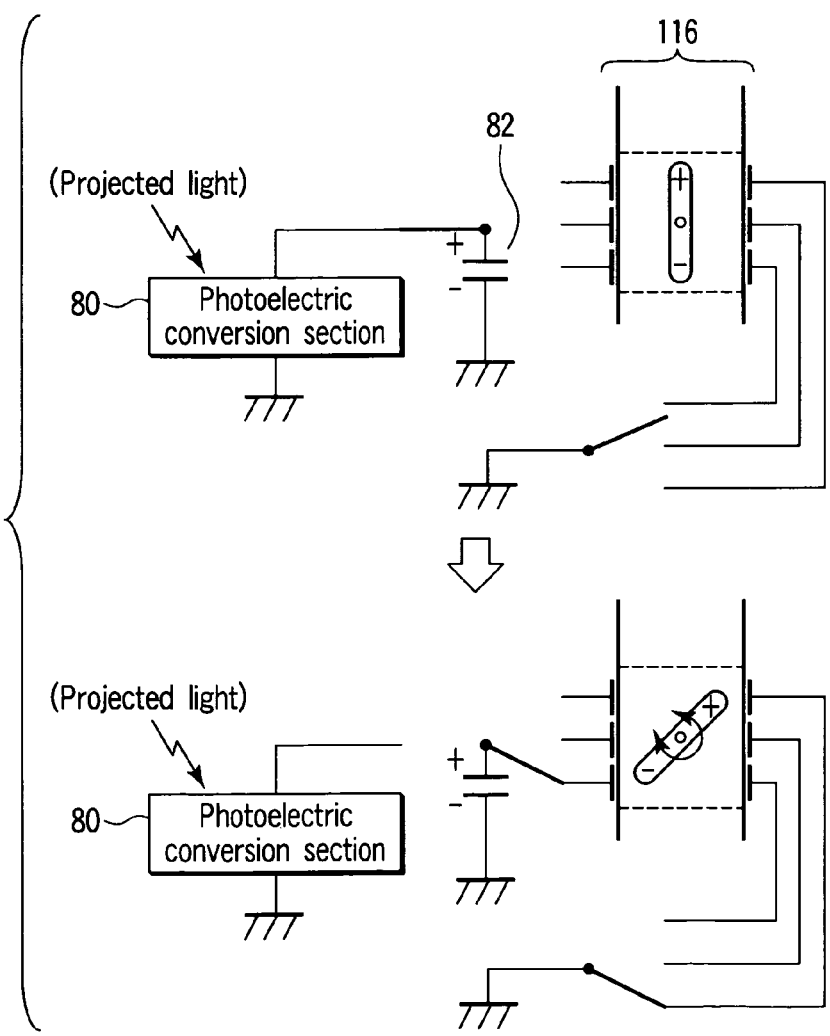
FIG. 25 is a view showing a modified example of a constitution of FIG. 23 in the case of using the photoelectric conversion section and the electricity accumulation section.

Incidentally, the photoelectric conversion section 80 and the electricity accumulation section 82 described above with reference to the fifth embodiment may be used in place of the power source 124. A constitution in such a case is shown in FIGS. 24 and 25.

Twelfth Embodiment

An embodiment is applied to a screen of a curtain type.

That is, as shown in FIG. 26, the screen 10 is formed in a dual structure of a curtain 130 and a screen reflection surface 36. Then, the curtain 130 and the screen reflection surface 36 are folded together to be housed, and the screen reflection surface 36 is spread in a drawn state of the curtain 130.

According to such a constitution, only the screen reflection surface 36 is deformed to enable effective condensation of a reflected luminous flux thereof on the observer 14.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reflection screen apparatus in which a projection apparatus projects an image based on received image data and an observer observes the image, comprising:
    a screen reflection surface which visibly diffuses and reflects the image projected by the projection apparatus to the observer;
    a light distribution correction section configured to change a state of a distribution direction of a light reflected on the screen reflection surface so as to increase a diffused light reflected on the screen reflection surface to the observer; and
    a projected luminous flux incident angle detection section configured to detect an angle of the projected light of the projection apparatus made incident on the screen reflection surface, wherein
    the light distribution correction section changes the state of the distribution direction of the light reflected on the screen reflection surface based on the angle detected by the projected luminous flux incident angle detection section.

2. The apparatus according to claim 1, further comprising a screen light distribution angle storage section configured to store a light distribution angle of the light reflected on the screen reflection surface, wherein
    the light distribution correction section changes the state of the distribution direction of the light reflected on the screen reflection surface based on the angle detected by the projected luminous flux incident angle detection section and the light distribution angle stored by the screen light distribution angle storage section.

3. The apparatus according to claim 1, wherein
    the projected luminous flux incident angle detection section includes:
        a condenser lens arranged on a front side of the screen reflection surface; and
        one of a light spot position detection sensor and a light amount detection sensor, configured to detect a light condensed by the condenser lens, and
    the projected luminous flux incident angle detection section detects the angle of the light made incident on the screen reflection surface based on one of a light spot position detected by the light spot position detection sensor and an amount of a light detected by the light amount detection sensor.

4. A reflection screen apparatus in which a projection apparatus projects an image based on received image data and an observer observes the image, comprising:
    a screen reflection surface which visibly diffuses and reflects the image projected by the projection apparatus to the observer, the screen reflection surface having a predetermined reflected light distribution angle, and
    a light distribution correction section configured to change a state of a distribution direction of a light reflected on the screen reflection surface so as to increase a diffused light reflected on the screen reflection surface to the observer,
    wherein the light distribution correction section changes the state of the distribution direction of the light reflected on the screen reflection surface by deforming the screen reflection surface to be a concave surface shape seen from the observer.

5. The apparatus according to claim 4, wherein the light distribution correction section
    includes deformation wires roughly arranged on both ends of the screen reflection surface, and
    deforms the screen reflection surface to be the concave surface shape along the deformation wires.

6. A reflection screen apparatus in which a projection apparatus projects an image based on received image data and an observer observes the image, comprising:
    a screen reflection surface which visibly diffuses and reflects the image projected by the projection apparatus to the observer; and
    a light distribution correction section configured to change a state of a distribution direction of a light reflected on the screen reflection surface so as to increase a diffused light reflected on the screen reflection surface to the observer, wherein
    the light distribution correction section includes:
        a deformation pattern storage section configured to store a plurality of kinds of deformation shape patterns of the screen reflection surface; and
        a deformation pattern selection section configured to cause the observer to select one of the deformation shape patterns stored by the deformation pattern storage section, and
    the light distribution correction section deforms a shape of the screen reflection surface based on the deformation shape pattern selected by the deformation pattern selection section.

7. A reflection screen apparatus in which a projection apparatus projects an image based on received image data and an observer observes the image, comprising:
    a screen reflection surface which visibly diffuses and reflects the image projected by the projection apparatus to the observer;
    a light distribution correction section configured to change a state of a distribution direction of a light reflected on the screen reflection surface so as to increase a diffused light reflected on the screen reflection surface to the observer;
    an observer covering area setting section configured to set an observer covering area that is information of a position in which the observer is present; and
    a screen light distribution angle storage section configured to store the light distribution angle of the light reflected on the screen reflection surface, wherein the light distribution correction section includes:
　　a screen deformation amount calculation section configured to calculate an optimal deformation amount of the screen reflection surface based on the incident angle of the light on the screen reflection surface detected by the projected luminous flux incident angle detection section, the observer covering area set by the observer covering area setting section, and the light distribution angle stored by the screen light distribution angle storage section;
　　a deformation amount display section configured to display the optimal deformation amount calculated by the screen deformation amount calculation section;
　　a deformation pattern storage section configured to store the deformation shape patterns of the screen reflection surface; and
　　a deformation pattern selection section configured to cause the observer to select one of the deformation shape patterns stored by the deformation pattern storage section based on the optimal deformation amount displayed by the deformation amount display section, and
　the light distribution correction section changes the shape of the screen reflection surface based on the deformation shape pattern selected by the deformation pattern selection section.

8. A reflection screen apparatus in which a projection apparatus projects an image based on received image data and an observer observes the image, comprising:
　a screen reflection surface which visibly diffuses and reflects the image projected by the projection apparatus to the observer;
　a light distribution correction section configured to change a state of a distribution direction of a light reflected on the screen reflection surface so as to increase a diffused light reflected on the screen reflection surface to the observer; and
　a photoelectric conversion section configured to convert light projected on the screen reflection surface into power, and supply the power to the light distribution correction section, wherein
　the light distribution correction section changes the state of the light distribution direction on the screen reflection surface by using the power supplied from the photoelectric conversion section.

9. A reflection screen apparatus in which a projection apparatus projects an image based on received image data and an observer observes the image, comprising:
　a screen reflection surface which visibly diffuses and reflects the image projected by the projection apparatus to the observer;
　a light distribution correction section configured to change a state of a distribution direction of a light reflected on the screen reflection surface so as to increase a diffused light reflected on the screen reflection surface to the observer; and
　an observer covering area setting section configured to set an observer covering area that is information of a position in which the observer is present, wherein
　the light distribution correction section changes the state of the light distribution direction on the screen reflection surface based on the observer covering area set by the observer covering area setting section.

10. The apparatus according to claim 9, wherein
the observer covering area setting section includes:
　　at least one marker which emits a light to at least the screen reflection surface; and
　　a marker light spot position detection sensor configured to receive the light emitted from the marker to obtain a coordinate position of the marker relative to the screen reflection surface, and
　the observer covering area setting section sets the observer covering area based on the coordinate position obtained by the marker light spot position detection sensor.

11. The apparatus according to claim 10, wherein the observer covering area setting section sets a space surrounded with a plurality of marker coordinates obtained by the marker light spot position detection sensor as the observer covering area.

12. The apparatus according to claim 10, wherein the observer covering area setting section sets a space that has a predetermined spatial spread including the marker coordinate obtained by the marker light spot position detection sensor as the observer covering area.

13. A reflection screen apparatus in which a projection apparatus projects an image based on received image data and an observer observes the image, comprising:
　a screen reflection surface which visibly diffuses and reflects the image projected by the projection apparatus to the observer; and
　a light distribution correction section configured to change a state of a distribution direction of a light reflected on the screen reflection surface so as to increase a diffused light reflected on the screen reflection surface to the observer;
　wherein the light distribution correction section:
　　includes at least one photodetection sensor configured to receive the light reflected on the screen reflection surface to detect an amount thereof, and
　　changes the state of the light distribution direction on the screen reflection surface in such a way that a total amount of the light detected by the photodetection sensor becomes maximum.

14. A reflection screen apparatus in which a projection apparatus projects an image based on received image data and an observer observes the image, comprising:
　a screen reflection surface which visibly diffuses and reflects the image projected by the projection apparatus to the observer; and
　a light distribution correction section configured to change a state of a distribution direction of a light reflected on the screen reflection surface so as to increase a diffused light reflected on the screen reflection surface to the observer;
　wherein the light distribution correction section:
　　includes a plurality of photodetection sensors configured to receive the light reflected on the screen reflection surface to detect an amount thereof, and
　　changes the state of the light distribution direction on the screen reflection surface in such a way that a difference in amounts of lights detected by the plurality of photodetection sensors becomes minimum.

15. A reflection screen apparatus in which a projection apparatus projects an image based on received image data and an observer observes the image, comprising:
　a screen reflection surface which visibly diffuses and reflects the image projected by the projection apparatus to the observer; and
　a light distribution correction section configured to change a state of a distribution direction of a light reflected on the screen reflection surface so as to increase a diffused light reflected on the screen reflection surface to the observer;

wherein a plurality of movable micro-diffusion reflection surfaces are disposed on the screen reflection surface, and wherein the light distribution correction section changes the state of the direction of the light reflected on the screen reflection surface by moving the micro-diffusion reflection surfaces.

16. The apparatus according to claim 15, wherein the micro-diffusion reflection surfaces hold deformation by electrostatic forces.

17. A projection system comprising:

projection apparatus which projects an image based on received image data;

reflection screen apparatus in which an observer observes the image, the reflection screen apparatus including:

a screen reflection surface which visibly diffuses and reflects the image projected by the projection apparatus to the observer; and a light distribution correction section configured to change a state of a distribution direction of a light reflected on the screen reflection surface so as to increase a diffused light reflected on the screen reflection surface to the observer, the light distribution correction section changing the state of the light distribution direction and outputting image correction information in accordance with an amount of the change; and an image correction section configured to execute image correction for the image data sent to the projection apparatus based on the image correction information from the light distribution correction section.

18. The system according to claim 17, wherein the image correction executed by the image correction section is distortion correction of an image.

19. The system according to claim 17, wherein the image correction executed by the image correction section is nonuniform luminance correction of an image.

20. A projection system comprising:

projection apparatus which projects an image based on received image data;

reflection screen apparatus in which an observer observes the image, the reflection screen apparatus including:

a screen reflection surface which visibly diffuses and reflects the image projected by the projection apparatus to the observer; and light distribution correction means for changing a state of a distribution direction of a light reflected on the screen reflection surface so as to increase a diffused light reflected on the screen reflection surface to the observer, the light distribution correction means changing the state of the light distribution direction and outputting image correction information in accordance with an amount of the change; and image correction means for executing image correction for the image data sent to the projection apparatus based on the image correction information from the light distribution correction means.

* * * * *